United States Patent
Coxhead et al.

[11] Patent Number: 5,833,902
[45] Date of Patent: Nov. 10, 1998

[54] INJECTION MOLDING APPARATUS AND PROCESS FOR CHANGING MOLD ELEMENTS

[75] Inventors: Bruce Coxhead, Nobelton; Robert Schad, Toronto, both of Canada

[73] Assignee: Husky Injection Molding Systems Ltd., Canada

[21] Appl. No.: 736,513

[22] Filed: Oct. 24, 1996

[51] Int. Cl.⁶ .................................................. B29C 45/03
[52] U.S. Cl. .................. 264/106; 264/297.2; 264/328.8; 264/334; 425/183; 425/185; 425/190; 425/556; 425/588; 425/810
[58] Field of Search ...................................... 264/1.33, 106, 264/107, 297.2, 328.8, 334; 425/185, 190, 192 R, 193, 253, 254, 546, 556, 574, 575, 588, 810, 186, 183

[56] References Cited

U.S. PATENT DOCUMENTS

| | | |
|---|---|---|
| 3,196,485 | 7/1965 | Battenfeld et al. . |
| 4,421,469 | 12/1983 | Egger et al. ............................. 425/186 |
| 4,427,353 | 1/1984 | Omiya et al. . |
| 4,662,835 | 5/1987 | Fukuda et al. ............................ 425/810 |
| 4,737,095 | 4/1988 | Hehl ........................................ 425/190 |
| 4,737,096 | 4/1988 | Poorten .................................... 425/810 |
| 4,917,833 | 4/1990 | Cools . |
| 4,923,381 | 5/1990 | Delmer et al. ............................ 425/186 |
| 4,971,548 | 11/1990 | Asai . |
| 4,981,634 | 1/1991 | Maus et al. . |
| 5,185,119 | 2/1993 | Schad et al. . |
| 5,186,958 | 2/1993 | Schmidt .................................. 425/193 |
| 5,192,474 | 3/1993 | Eichlseder et al. . |
| 5,386,793 | 11/1994 | Lau ........................................ 264/39 |
| 5,394,599 | 3/1995 | Kubota et al. ............................ 264/39 |
| 5,401,158 | 3/1995 | Kubota et al. . |
| 5,516,276 | 5/1996 | Takayama et al. . |
| 5,612,068 | 3/1997 | Kempf et al. ............................ 425/810 |
| 5,643,615 | 7/1997 | Austin .................................... 425/186 |

FOREIGN PATENT DOCUMENTS 0605025  7/1994  European Pat. Off. .

*Primary Examiner*—Jill L. Heitbrink
*Attorney, Agent, or Firm*—Bachman & LaPointe, P.C.

[57] ABSTRACT

The invention covers an injection molding apparatus and injection molding process. The apparatus has at least a first and second injection molding machine adjacent one another, with each machine including upper and lower mold elements operative to form molded products; and robot adjacent said injection molding machines operative to remove and replace at least a portion of one of said mold elements from a first of said injection molding machines while the second of said injection molding machines continues to form molded products.

18 Claims, 5 Drawing Sheets

INJECTION MOLDING APPARATUS AND PROCESS FOR CHANGING MOLD ELEMENTS

BACKGROUND OF THE INVENTION

The invention relates to a cost efficient and flexible injection molding apparatus, especially an apparatus for the manufacture of discs, such as optical discs, compact discs, video discs or the like.

The mass production of discs, such as optical recording discs or audio CD's, is performed on single cavity injection molding machines linked with secondary processing equipment for metalizing, decorating, lacquering and inspecting the molded articles. Typically, production cells are arranged in a "clean room" environment with each unit acting independently of the next. The handling of tooling for program changes and the finished product is not coordinated or performed automatically from one machine to the next. A typical factory layout may use two molding machines feeding parts to downstream processing equipment via a conventional conveyor.

Alternatively, one may employ two separate vertical clamping injection molding units with single cavity molds to produce the discs. Each unit may employ a dedicated robot to unload the produced parts and place them on a conveyor which carries the parts to the processing equipment for further processing, e.g., sputtering (metalizing), bonding and inspection. Each station may have means to store a limited number of discs to act as a buffer between operators.

It is desirable to provide means for automatically changing the stamper and also for automatically handling the stamper once removed from the mold.

U.S. Pat. No. 4,917,833 to Cools shows a conventional single cavity CD mold with a means to speed up stamper changing by using a quick release lock ring that can be used by the operator to handle the stamper. U.S. Pat. No. 4,971,548 to Asai shows a two cavity disc mold having a quick removable pack for stamper changing; however, similar to the '833 patent the operator is required to handle the unit during the process. U.S. Pat. No. 5,401,158 to Kubota et al. shows another stamper changing unit that automatically loads and unloads stampers from the mold, but requires subsequent manual transport from the changing unit.

European Patent 0605025 to Becker et al. shows a two cavity disc mold in a single horizontal clamping machine having individual injection units, one for each mold, and a robot to unload both produced parts simultaneously. U.S. Pat. No. 4,981,634 to Maus et al. shows a method for unloading the molded parts that does not require opening the mold, and U.S. Pat. No. 5,192,474 to Eichlseder et al. shows removing the molded parts by using part of the mold as the carrier.

In all cases where automatic removal of molded parts is shown, one robot per machine/mold is employed in which the robot remains idle most of the time. This represents an inefficient utilization of the robot which does not optimize its cost.

U.S. Pat. No. 3,196,485 to Battenfeld et al. and U.S. Pat. No. 4,427,353 to Omiya et al. both show vertical clamping, single cavity disc molding machines. The '485 patent teaches a compression process with resin being delivered from a horizontal unit directly into the open mold, whereas the '353 patent shows another compression unit with the resin delivered from a reciprocating injection unit mounted vertically and coaxial with the vertically acting clamp.

There is a rapidly rising demand for optical disc production for audio CD, CD-Rom and DVD applications. To meet this demand there is a need for a cost efficient, flexible manufacturing cell configuration that can be integrated into a complete factory operation so that automation of the apparatus and process can be maximized and resources optimized.

Accordingly, it is a principal object of the present invention to provide an improved injection molding apparatus and process that is cost efficient and flexible.

It is a further object of the present invention to provide an apparatus and process as aforesaid that is operative to prepare molded discs and automatically exchanges stamper units with a minimum of disruption.

Further objects and advantages of the present invention will appear hereinbelow.

SUMMARY OF THE INVENTION

In accordance with the present invention, the foregoing objects and advantages are readily obtained.

The injection molding apparatus of the present invention comprises: at least a first and second injection molding machine adjacent one another, with each machine including fixed and movable mold elements operative to form molded products, and robot means adjacent said injection molding machines operative to remove and replace at least a portion of one of said mold elements from a first of said injection molding machines while the second of said injection molding machines continues to form molded products. Preferably the molded products are discs and the mold elements include a stamper unit, with the robot means being operative to remove and replace a stamper unit from the first injection molding machine while the second injection molding machine continues to form discs. The apparatus is operative to sequentially remove and replace a stamper unit from the first and second injection molding machine while the other machine continues to form discs.

In accordance with the present invention, one robot is used to unload the molded parts from both injection molding machines. In addition, the automatic stamper change robot conveys the stampers to and from a storage area where the stampers are prepared, and an automatic control system controls which stamper is loaded into which machine at what time to produce a specified number of molded articles, thereby providing an automated production factory system.

The process of the present invention provides at least a first and second injection molding machine adjacent one another, with each machine including fixed and movable mold elements operative to form molded products, with the molded products preferably being discs and the mold elements preferably including a stamper unit. The process of the present invention removes and replaces at least a portion of one of the mold elements, as a stamper unit, from a first of the injection molding machines by a robot means while the second of the injection molding machines continues to form molded products.

Further features of the apparatus and process of the present invention will appear hereinbelow.

BRIEF DESCRIPTION OF THE DRAWINGS

The present invention will be more readily understandable from a consideration of the following exemplificative drawings, wherein.

DETAILED DESCRIPTION OF PREFERRED EMBODIMENTS

Figure 3:
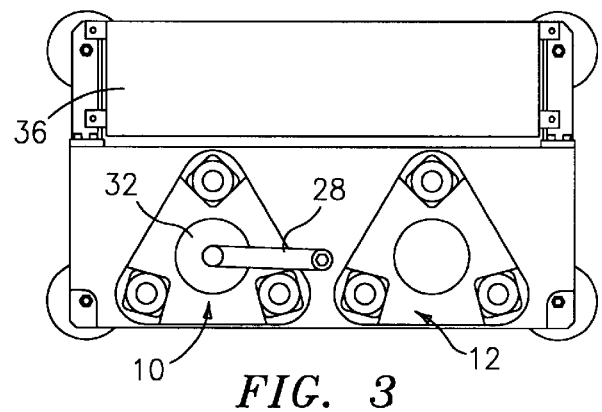
FIG. 3 is a plan view of the apparatus of FIG. 1 showing two side-by-side injection molding machines.
Figure 1:
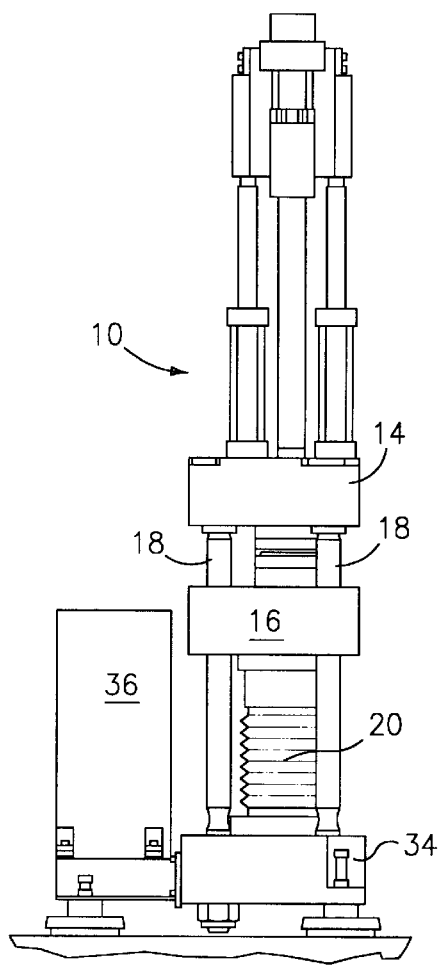
FIG. 1 is a side view of an injection molding apparatus of the present invention.
Figure 2:
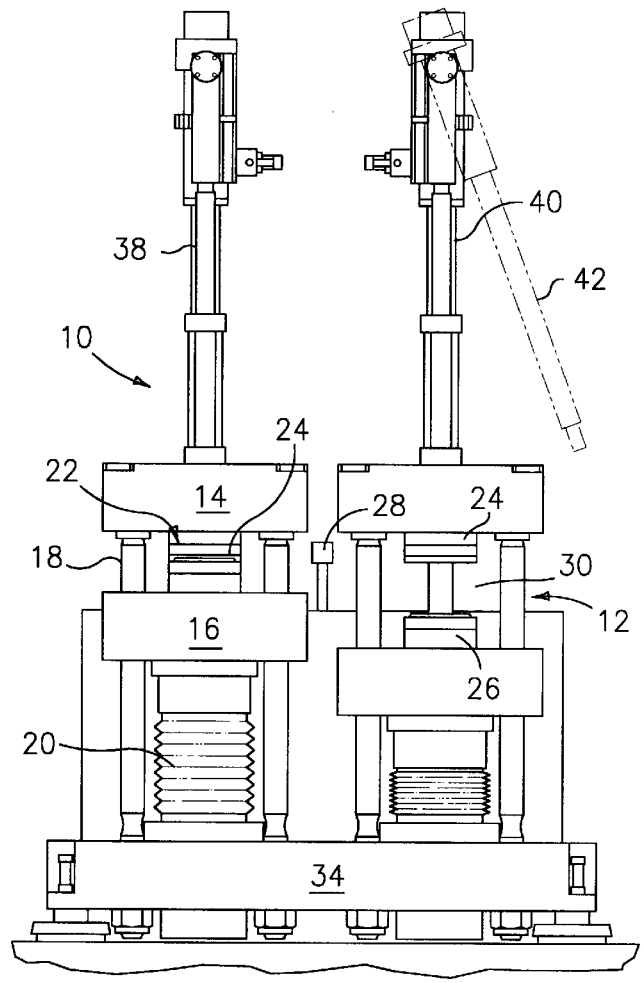
FIG. 2 is a front view of the apparatus of FIG. 1.
Figure 4:
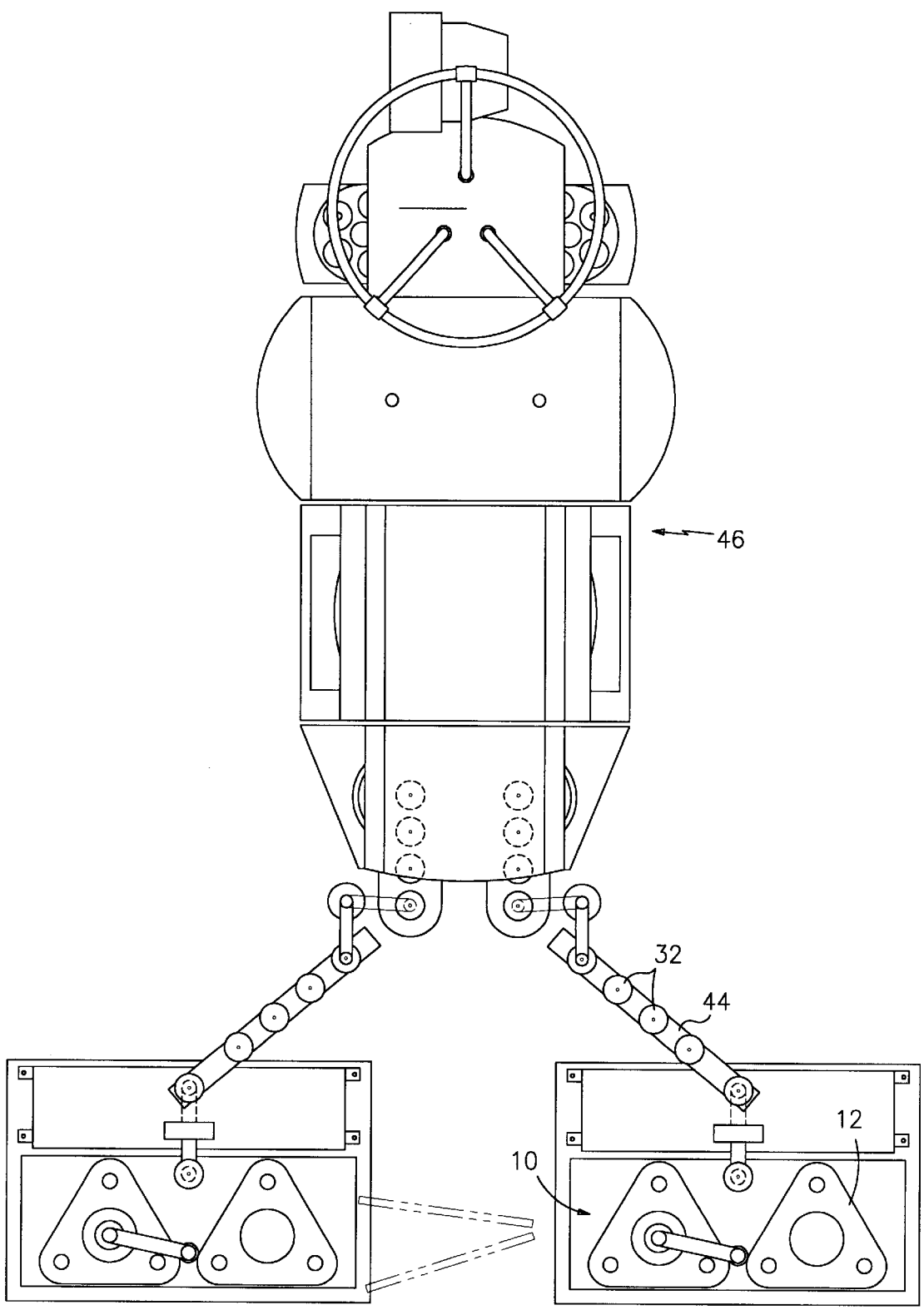
FIG. 4 is a plan view of a disc manufacturing cell using the injection molding apparatus of the present invention.

Referring to FIGS. 1, 2 and 3, a two station, vertically clamping disc injection molding machine is shown comprising two side-by-side vertical clamp units, namely, a first injection molding machine 10 and an adjacent second injection molding machine 12. The discs can be any desired disc, as optical discs, compact discs, video discs or the like. Each injection molding machine includes a fixed platen 14, a movable platen 16, a plurality of tiebars 18 as for example three tiebars in this embodiment, and motive means 20 to move the movable platen 16 on the tiebars 18 to the closed position shown in FIG. 2 for machine 10 and to the open position shown in FIG. 2 for machine 12.

Molds 22 including mold halves 24 and 26 are positioned between platens 14 and 16, with mold half 24 fixed to stationary platen 14 and mold half 26 fixed to movable platen 16. Therefore, movement of platen 16 via motive means 20 from the open to closed position moves mold half 26 to the closed position and closes mold 22.

A first mode of movement is during the injection molding of discs in mold 22. This mode of movement requires that mold half 26 be moved into the closed position as shown in FIG. 1 and in FIG. 2 for machine 10. In addition, the injection molding mode requires that movable platen 16 open mold 22 sufficiently to allow disc removal robot 28 to enter space 30 between open mold halves 24 and 26 and remove the molded disc 32 as shown in FIG. 3. This is called the first open position and consists of opening the mold only far enough for the part removal robot 28 to enter and remove the molded part, for example, about two inches, as shown in FIG. 3. Note that a single disc removal robot 28 is positioned adjacent machines 10 and 12 and serves to unload both of the side-by-side injection molding machines.

The second mode of movement requires movable platen 16 to open a distance wider than the first open position, with the second open position shown in FIG. 2 for machine 12, in order to permit the removal of a stamper unit or complete movable mold half by a second robot, as will be discussed hereinbelow. Thus, the second open position shown in FIG. 2 for machine 12 is the open position for changing the stamper because the stamper change robot needs more room, for example, about 12 inches. The opening mechanism 20 may consist of two elements. The first is a motor driven screw system for moving the movable platen to its furthest open position. This position is only used for stamper change and may not happen frequently, as for example once per hour; whereas opening the mold from the closed position to the first open position for part removal occurs for example once every 3.5 seconds. The mechanism for doing the motion to the first open position is a clamping piston (not shown) mounted underneath the movable platen and on top of the screw drive means. Thus, the two inch opening stroke is done with a hydraulic piston which also serves as the clamp piston and the 12 inch stroke is done with screw actuated drive means. Motive means 20 may be used for both the first and second modes of movement, or if desired a separate motive means may be used for these two modes of movement in order to allow optimization of energy consumption and cost of machine construction.

The two injection molding machines 10 and 12 are mounted on a common machine base 34, which also supports the machine services, such as hydraulic pump, motor, and tank and associated valving and controls shown schematically by unit 36.

Each machine 10 and 12 has an associated resin injection unit 38 and 40 mounted on top of their respective fixed platens. These may be conventional reciprocating screw units that are well known in the art and in this embodiment are adopted for vertical operation. Each resin injection unit may be mounted to permit vertical carriage travel in order to provide for separation of units 38 and 40 from machines 10 and 12 and to allow the units to be swung sideways as shown in phantom at 42 for unit 40 for purging or maintenance. The hydraulic power supply and control for both injection units 38 and 40 may be provided by the single set of machine services in unit 36, thereby optimizing energy efficiency while minimizing construction cost.

In operation, each machine 10 and 12 can operate independently or in synchronism with its side-by-side twin as required. Thus, while one machine is stopped for a stamper change or repair, the other machine can continue production without interruption. When both machines are in production, their cycles can be synchronized such that the single disc removal robot 28 can unload each machine sequentially, thereby optimizing the utilization of robot 28. Robot 28 discharges molded discs 32 from machines 10 and 12 onto a single conveyor 44 to transport the discs to the next stage of manufacturing.

A conventional metalizing (sputtering), bonding, decorating, lacquering and inspection unit 46 is used to complete the manufacturing process for the discs. One of units 46 can typically handle the output rate of two single cavity molding machines; however, in this case one unit is shown linked to a plurality, i.e., four, molding machines. With the advent of DVD production (video discs) the injection molding units may produce two halves of a single disc, which the downstream unit 46 will bond or weld into a single disc assembly. Thus, four injection molding units to maintain a high production rate.

Figure 5:
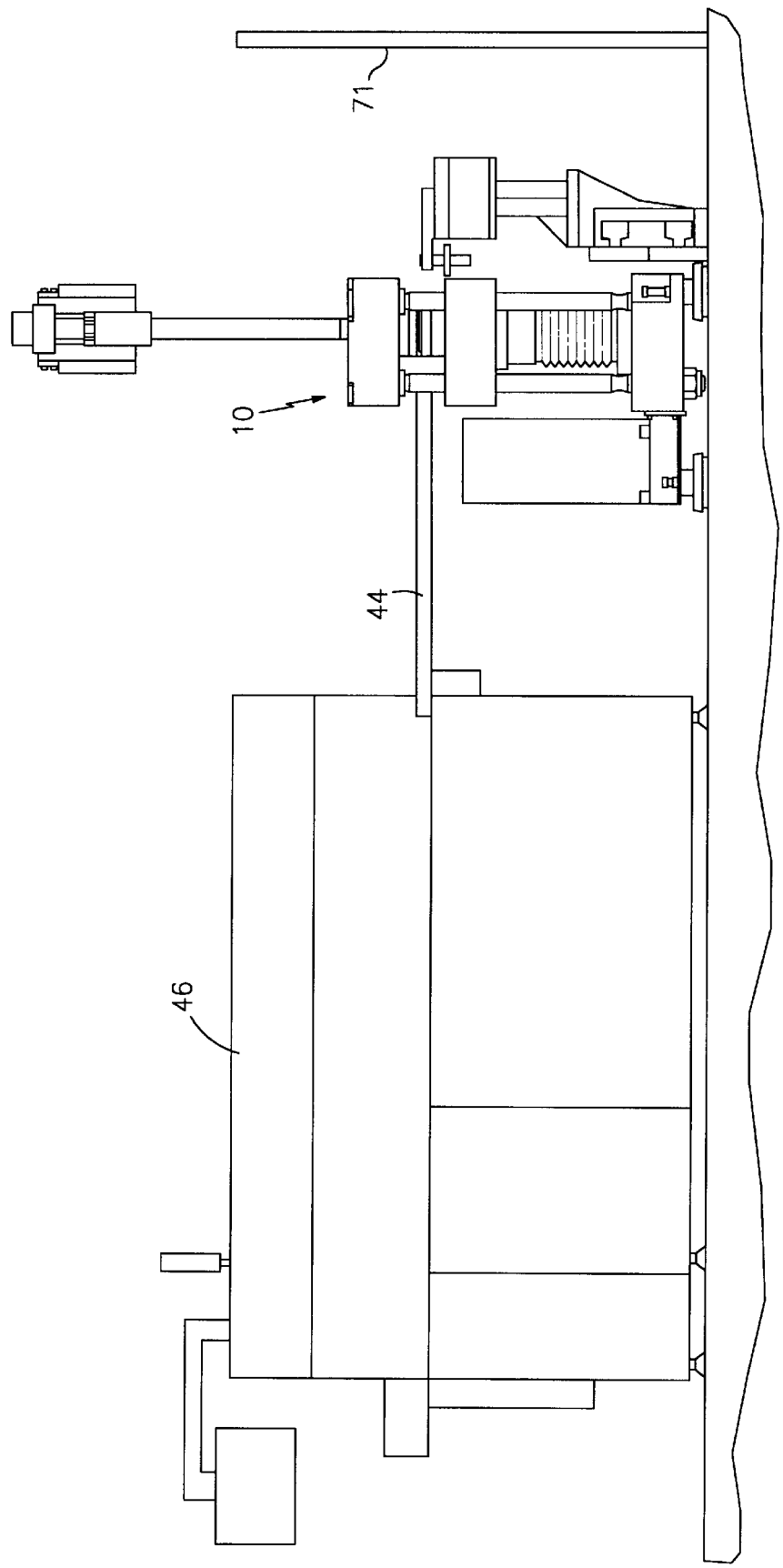
FIG. 5 is a side view of the disc manufacturing cell of FIG. 4.

FIG. 5 is a side view of a manufacturing cell of the present invention showing the downstream processing unit 46 and conveyor 44.

Figure 7:
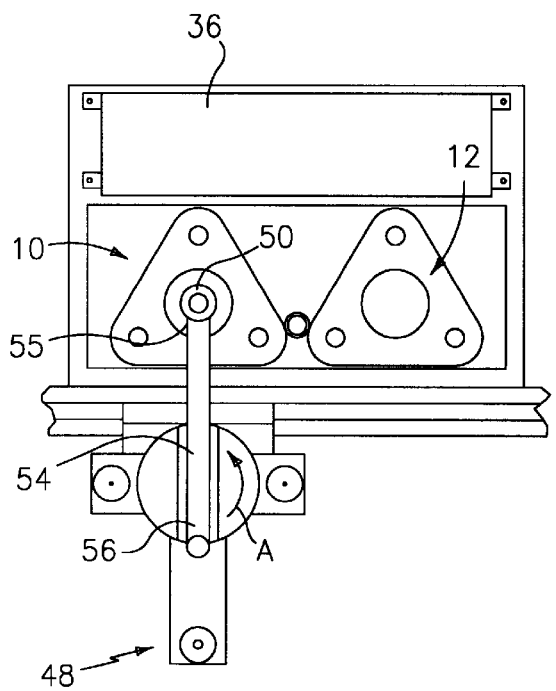
FIGS. 7–10 are detailed plan views of a stamper change unit showing, respectively, removal, mold cleaning, selection of new stamper, and loading new stamper.
Figure 8:
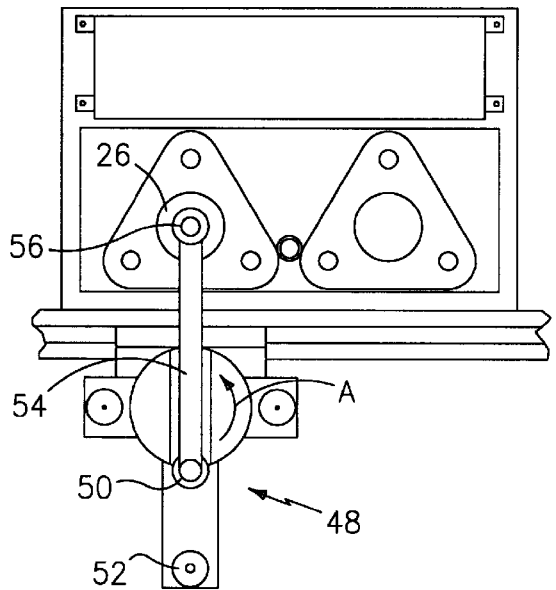
Figure 9:
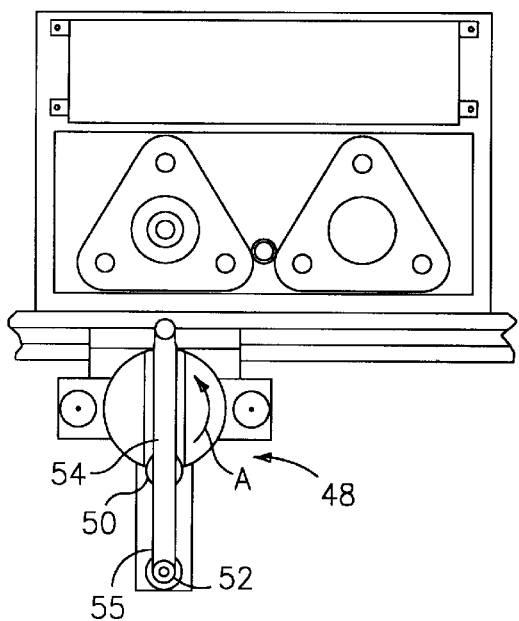
Figure 10:
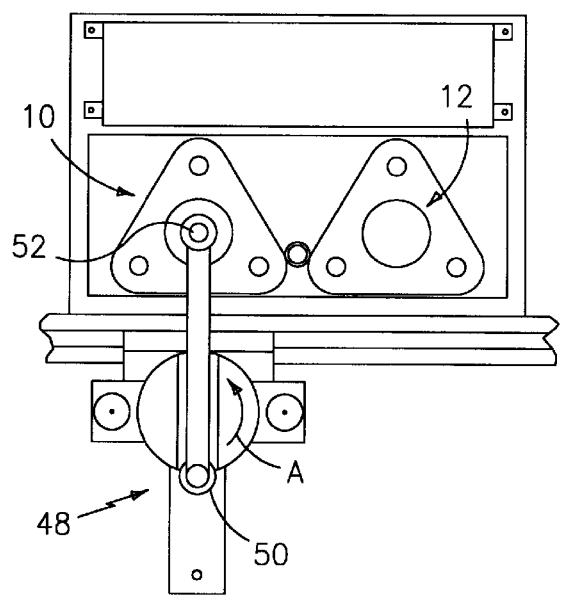

FIGS. 7–10 show a mold or mold stamper change robot 48 adjacent machines 10 and 12 and aligned with machine 10. Robot 48 is aligned with machine 10 in the second operating mode wherein the movable platen 16 and mold half 26 is opened to its furthest position spaced from fixed platen 14 and mold half 24. The robot 48 removes the used stamper 50 (or complete mold half), cleans the mold, and installs a new stamper 52 (or complete mold half) is installed, while machine 12 continues its operation uninterrupted. FIG. 7 shows robot 48 arm 54 first end 55 thereof removing used stamper 50 from machine 10. FIG. 8 shows arm 54 rotated 180° in the direction of arrow A from the position in FIG. 7, used stamper 50 is deposited, robot arm 54 has translated to move robot arm second end 56 into the mold area, and mold half 26 being cleaned by robot arm 54 second end 56 opposed to first end 55. FIG. 9 shows robot arm 54 moved axially to pick up new stamper 52 on robot 54 first end 55. FIG. 10 shows robot 54 returned to the position of FIGS. 7 and 8 and rotated 180° in the direction of arrow A to place new stamper 52 in mold 10.

After the replacement operation is completed, robot 48 disengages from machine 10 and the molding cycle of machine 10 is automatically resumed using the new stamper unit 52. Thus, in accordance with the present invention, changing the program material of the discs as well as cleaning the mold can be accomplished fully automatically and rapidly, with typical stamper change time being less than a few minutes.

Figure 6:
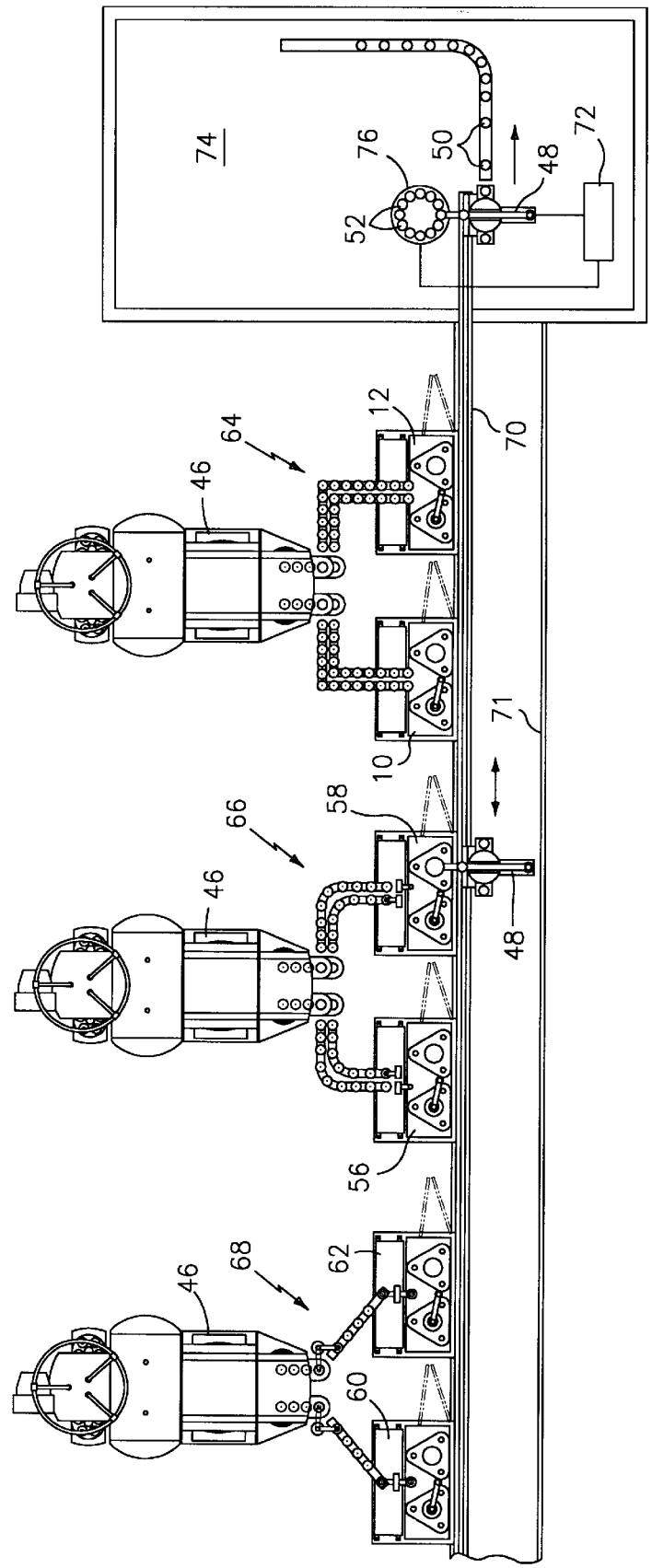
FIG. 6 is a plan view of a disc manufacturing layout using the injection molding apparatus of the present invention.

A typical factory layout is shown in FIG. 6 wherein a plurality of first and second injection molding machines are provided with a single robot means utilized to remove and replace stamper units (or molds) from all of them. Thus, machines 10 and 12 are shown as well as further machines 57 and 58 and 60 and 62, all adjacent each other. Still more of the machines can be provided, all serviced by a single robot means 48, but for simplicity only three sets have been shown. All machines are essentially the same with all operative to prepare injection molded discs.

Thus, each manufacturing cell comprises two injection molding machines, i.e., cell 64 includes machines 10 and 12, cell 66 includes machines 57 and 58 and cell 68 includes machines 60 and 62. Each cell has two molds, conveyors and downstream processing unit in a line such that track 70 may be mounted to the base of each of the molding machines. Robot 48 travels along track 70 and is able to service any of the molds in the row. The robot travel envelope may be shielded from personnel by a barrier 71 and access for servicing machines may be provided from the non-robot side of the track. Each molding unit is capable of being fully serviced without interruption and without interrupting the ability of robot 48 to continue servicing the other units that are in production.

Factory control system 72 located in or adjacent clean room 74 on track 70 controls which program stampers 52 are loaded and unloaded into which molding units via robot means 48. The clean room is simply a closed environment maintained free of dust and other pollutants and maintained as clean as feasible. FIG. 6 shows a robot means 48 adjacent cell 66 and a robot means 48 in clean room 74, whereas in practice only a single robot means would shuttle between the clean room and the various cells. Thus, robot means 48 returns used stampers 50 to clean room 74 and picks up new stampers 52 from carousel 76. Operators in the clean room prepare the new stampers and refurbish used ones as required by the production plan. Thus, unattended operation can be achieved when sufficient prepared stampers are loaded onto carousel 76 and the production control system 72 has been programmed to cause a predetermined number of discs to be manufactured with a predetermined variety of program material. Control system 72 also controls each of the injection molding machines and downstream processing units 46 in order to completely coordinate and synchronize the manufacturing program.

Obviously, other specific configurations of plant layout can be configured depending on the size of building or space available and the planned production capacity. However, in all cases, using the features of the present invention provides opportunities for optimizing factory floor space, energy personnel, production, machinery costs, etc. in order to obtain a specified production rate of finished discs.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Injection molding process, which comprises:

providing at least a first and second injection molding machine adjacent one another, with each machine including fixed and movable halves and removable mold elements operative to simultaneously form molded products, wherein said molded products are discs and said mold elements include a stamper unit;

sequentially removing and replacing said mold elements on a first and second of said injection molding machines by a first robot means while leaving the mold halves in place and, including the steps of sequentially removing and replacing a stamper unit from a first and second injection molding machines by said first robot means while the injection molding machines which does not have a stamper unit being removed continues to form discs; and unloading molded products from both the first and second machines by a second robot means positioned adjacent said first and second machines.

2. Process according to claim 1, including the step of unloading molded discs from the first and second machines via a single disc removal second robot positioned adjacent said first and second machines.

3. Process according to claim 2, including the step of feeding discs from a plurality of said machines to a further processing station downstream of said machines.

4. Process according to claim 1, including the step of cleaning said first injection molding machine by said first robot means prior to replacing said stamper unit.

5. Process according to claim 1, including providing a plurality of injection molding machines adjacent each other, and removing and replacing stamper units from said plurality with a single first robot means.

6. Process according to claim 5, including locating said plurality in a row and providing track means adjacent said plurality, wherein said first robot means moves along said track means to remove and replace stamper units from said plurality.

7. Process according to claim 6, including providing a supply of new stamper units in a clean room adjacent said machines, including said first robot means obtaining new stamper units from said supply and depositing used stamper units in said clean room.

8. Process according to claim 5, including conveying a stamper unit to a control system and replacing a stamper unit from a control system, wherein the control system is operative to determine which stamper unit is used for said replacement.

9. Process according to claim 1, including separating said mold halves a first distance apart to enable unloading molded products, and a second distance larger than the first distance to enable removal of said mold elements.

10. Injection molding apparatus, which comprises:

at least a first and second injection molding machine adjacent one another, with each machine including fixed and movable mold halves and removable mold elements operative to simultaneously form molded products, wherein said molded products are discs, and said mold elements include a stamper unit;

first robot means adjacent said injection molding machines operative to sequentially remove and replace said mold elements from a first and second of said injection molding machines while leaving the mold halves in place and wherein said first robot means is operative to sequentially remove and replace a stamper unit from the first and second injection molding machines while the injection molding machine which does not have a stamper unit being removed and replaced continues to form discs; and second robot means positioned adjacent said first and second machines operative to unload molded products from both the first and second machines.

11. Apparatus according to claim 10, including side-by-side injection molding machines.

12. Apparatus according to claim 10, including a single disc removal second robot positioned adjacent said first and second machines operative to unload molded discs from both the first and second machines.

13. Apparatus according to claim 12, including means for feeding said discs from the disc removal robot to a further processing station downstream of said first and second machines, wherein said means for feeding receives discs from a plurality of said machines.

14. Apparatus according to claim 10, wherein said first robot means includes means to clean said first injection molding machine prior to replacing said stamper unit.

15. Apparatus according to claim 10, including a plurality of first and second injection molding machines adjacent each other, with a single first robot means operative to remove and replace stamper units from said plurality.

16. Apparatus according to claim 15, wherein said plurality are connected with a track means adjacent said plurality, wherein said single robot means moves on said track means to remove and replace stamper units from said plurality.

17. Apparatus according to claim 16, including a supply of new stamper units located in a clean room adjacent said machines, wherein said first robot means obtains new stamper units from said supply and deposits used stamper units in said clean room.

18. Apparatus according to claim 10, wherein said mold halves are separable a first distance apart to enable unloading molded products, and a second distance larger than the first distance to enable removal of said mold elements.

* * * * *